W. C. RUSSELL.
Ice-Pick.
No. 161,282.            Patented March 23, 1875.
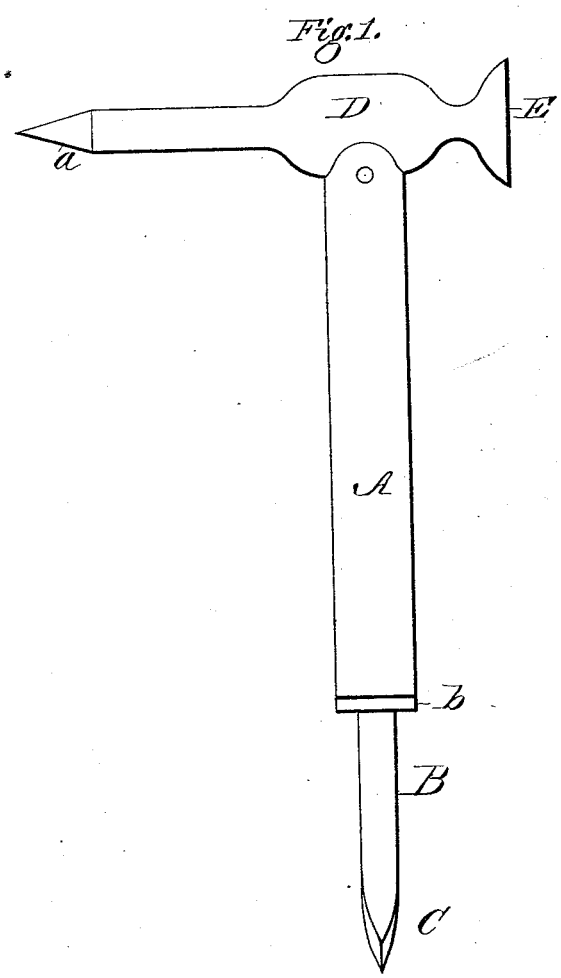
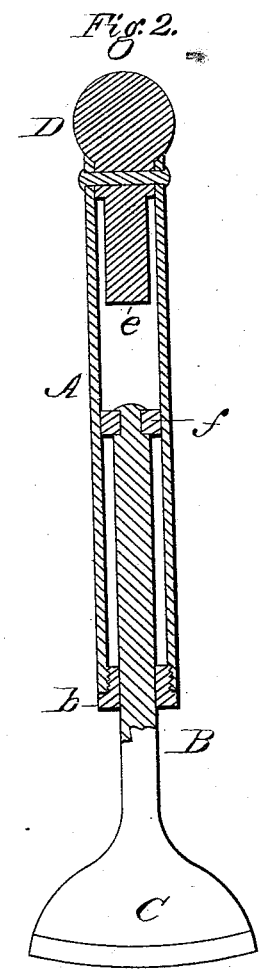
Witnesses:
Will. H. Dodge
Wm E Chaffee
Inventor:
Wm C. Russell
by Dodge & Son
Attys

UNITED STATES PATENT OFFICE.

WILLIAM C. RUSSELL, OF PHILADELPHIA, PENNSYLVANIA.

IMPROVEMENT IN ICE-PICKS.

Specification forming part of Letters Patent No. 161,282, dated March 23, 1875; application filed September 9, 1874.

*To all whom it may concern:*

Be it known that I, WILLIAM C. RUSSELL, of Philadelphia, in the county of Philadelphia and State of Pennsylvania, have invented certain Improvements in Ice-Picks, of which the following is a specification:

My invention relates to ice-picks; and it consists in constructing the tool in such a manner as to combine in one tool an ice-chisel, with a sliding handle and weight for operating it, a hammer, and a pick or point, all as hereinafter more fully set forth.

Figure 1 is a side elevation of my combined tool, and Fig. 2 is a longitudinal section of the same.

In constructing my improved tool I first provide a chisel or hatchet shaped blade, C, which has a rigid stem, B, as shown in Fig. 2. I then provide a tubular handle, A which has rigidly secured to one end a head, D, having a hammer-face, E, at one end, and sharp point or pick *a* at its opposite end, as represented in Fig. 1. This head D has a short stem, *e*, which is inserted within the tubular handle A, as shown in Fig. 2. The stem B of the blade C is first passed through a hole in a nut, *b*, which is fitted to screw into the lower end of the tubular handle A, and upon the upper end of this stem B I then secure a collar, *f*, of such a size as to fit loosely within the handle A. After this collar *f* is secured upon the stem B, it, with the stem, is shoved into the tubular handle A, when the nut *b* is screwed into the lower end of the tube, thus uniting the parts, as represented in Fig. 2, when the tool is complete.

To cut ice into regular-shaped pieces the blade C is held upon it and struck with the weighted handle, the blade C being moved along without raising it from the ice. The point *a* serves to break the ice into irregular lumps, while the flat face E serves to pulverize it when required, the implement thus serving all the various purposes for which, ordinarily, several tools are required.

I am aware that a sliding weighted handle has been used on an ice-pick, and also that a flat cutting-blade has been used in various ways, and therefore I do not claim these features separately; but What I do claim is—

The herein-described implement for cutting and breaking ice, consisting of the flat blade C, provided with the stem B, and the tubular handle A, provided with the head D, having the face E and point *a*, all constructed substantially as set forth.

WILLIAM C. RUSSELL.

Witnesses:
 JOSEPH B. STRAFFORD,
 JOHN RODGERS.